Nov. 11, 1924.

A. J. LOEPSINGER.
SPRINKLER HEAD.
ORIGINAL FILED MAR. 11, 1918.

Re. 15,941

Inventor
Albert J. Loepsinger
By Mitchell, Chadwick & Kent
Attorneys

Reissued Nov. 11, 1924. Re. 15,941

UNITED STATES PATENT OFFICE.

ALBERT J. LOEPSINGER, OF EDGEWOOD, RHODE ISLAND, ASSIGNOR TO GENERAL FIRE EXTINGUISHER COMPANY, OF PROVIDENCE, RHODE ISLAND, A CORPORATION OF NEW YORK.

SPRINKLER HEAD.

Original application filed March 11, 1918, Serial No. 221,850. Divided and application filed July 20, 1921, Serial No. 486,058. Original No. 1,439,177, dated December 19, 1922. Application for reissue filed September 27, 1924. Serial No. 740,715.

*To all whom it may concern:*

Be it known that I, ALBERT J. LOEPSINGER, a citizen of the United States, residing at Edgewood, in the county of Providence and State of Rhode Island, have invented certain new and useful Improvements in Sprinkler Heads, of which the following is a specification.

The invention relates to improvements in sprinkler-heads, being a division of the subject matter disclosed in my application for patent, Serial No. 221,850, filed March 11, 1918. It is intended that the present patent shall cover by suitable expression in the appended claims, whatever features of patentable novelty exist in the invention herein disclosed. Said invention is designed primarily for use in connection with that class of sprinkler-heads known in the art as open sprinklers which are designed and adapted for use upon the exterior of buildings to direct a stream of water against the exterior wall of the building and through or against the windows thereof.

In sprinkler-heads of this character as heretofore produced, a deflector has been employed which has a flat surface arranged opposite the outlet opening and at right angles to the axis thereof. The great objection to the use of a deflector of this character resides in the fact that the stream of water issuing from the outlet opening is not only broken up after it issues from the nozzle and when it strikes the surface of the deflector which is arranged at right angles to the axis of the outlet opening, but the velocity and energy of said stream at the same time is greatly reduced, which in turn reduces the area of distribution.

The principal object of the present invention is to overcome the above objections and to provide a sprinkler-head of this type with a deflector of such character as not to decrease the velocity of the stream of water to as great an extent as would a flat deflector, and also to produce a wider and better distribution of said stream against the wall of the building protected.

A further object of the invention consists in providing the sprinkler with a deflector of the above character which is arranged and adapted to receive and direct the stream of water tangentially to the inner surface of said deflector.

A further object of the invention consists in providing the sprinkler with a deflector of the above character which has a continuous curved surface extending from the sprinkler nozzle and partially surrounding the outlet opening for directing and controlling the flow of water from the moment it leaves said nozzle.

It is a result of the invention that the relative amount of water projected from various segments of the deflector can be controlled so that while the whole is projected to one side of a plane through the axis of the nozzle, so as to strike an adjacent plane surface, such as the outside wall of a building, the distribution of flow may be either made approximately uniform from all parts of the delivery edge of the deflector, or approximately uniform toward all the parts of the wall which it is to strike, or may be otherwise controlled, either to concentrate a considerable flow at some particular region or regions, or to avoid concentration. This is accomplished by the provision of a ridge or raised part of the surface of the deflector over which the water flows, which ridge causes the water, which in the absence of the ridge would flow out straight in the middle in much larger volume, to be distributed somewhat transversely from the middle of the deflecting surface and to flow out more toward one side or the other, thus giving both a reduction of central flow and an increased throw toward each side. In such a case more water is supplied to the sides, where a given angle of the deflector has to supply a greater linear length of wall, because of the obliquity with which it strikes; and the throw in that direction is increased both in quantity and in force, which means throwing to a greater distance.

To these ends the invention consists in the novel construction and arrangement of parts hereinafter described and more particularly set forth in the claims.

In describing the invention in detail, reference will be had to the accompanying drawings in which, Figure 1 is a front elevation of a sprinkler-head embodying my novel construction.

Figure 1:
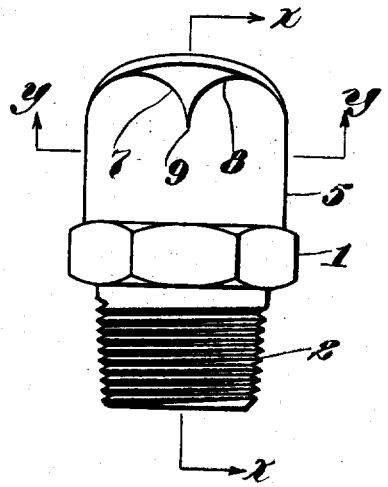
Figure 2:
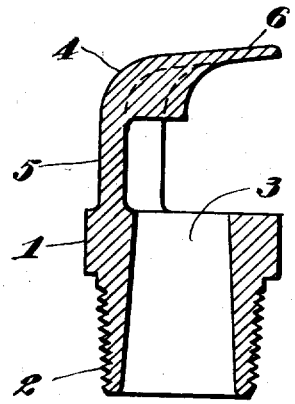
Figure 2 is a vertical sectional view on line $x$—$x$ Figure 1.
Figure 3:
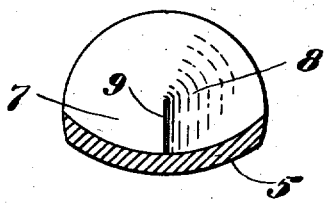
Figure 3 is a transverse sectional view on line $y$—$y$ Figure 1.

Referring to the drawings 1 represents a tubular nozzle having external threads 2 for attachment to a water supply system and the usual outlet opening 3. Formed integral with, or secured to, the nozzle 1 is a deflector 4 which comprises a body portion 5 extending substantially parallel to the axis of the nozzle 1 and located adjacent to and curved transversely so as to partially surround the outlet opening 3. The outer free end portion 6 of the deflector 4 extends laterally from the body portion 5, as shown in Figure 2. The interior surface of said deflector 4 is curved both transversely and longitudinally and the end portion 6 is provided upon its interior with two continuous curved surfaces 7 and 8, having a raised rib 9 at the point of intersection of said curved surfaces, as shown in Figure 1.

With the above construction it will be seen that the stream of water flowing from the outlet opening will be directed along the curved body portion 5 of the deflector 4 and flow tangentially along the continuous curved inner surface of said deflector 4 and be distributed from the outer free end 6 of said distributor tangentially to the plane of distribution. It will also be seen that a portion of the stream issuing from the outlet opening will be directed against the raised rib 9 and be distributed transversely as well as longitudinally from the curved surfaces 7 and 8.

It will also be seen that the continuous curved surfaces upon the interior of the distributor will cause a gradual change in the direction of flow of the water in such a manner as not to materially reduce the velocity, or energy thereof and also will result in the wider distribution of the stream. Inasmuch as the ridge does not extend to the delivery edge of the deflector, water is discharged from all parts of the edge of the deflector in a single continuous diverging sheet.

It will also be seen that by changing the curvature of the outer end 6 of the distributor the direction of distribution can likewise be changed so that the water can be distributed therefrom either at right angles to the axis of the nozzle or at an acute angle or an obtuse angle thereto.

I claim as my invention:

1. A sprinkler head, comprising a nozzle combined with a deflector, the said deflector being arranged starting in substantially the initial direction of the jet and curving with smooth non-spraying surface through substantially a right angle therefrom to a delivery edge spreading through a wide angle, whereby the momentum of the water flattens the current against the deflector into spreading sheet form; combined with a rear and side plate limiting the delivery to a spread not exceeding two right angles; said deflector having in its deflecting surface a ridge extending from said rear plate out toward said edge, and ending within the current, whereby water has access to flow from substantially all of said edge, said ridge being arranged and adapted to influence the lateral distribution of water over the surface of the deflector.

2. A sprinkler head comprising a nozzle combined with a deflector which, starting in the direction of the jet, is curved concavely and smoothly across the initial direction of the jet, the directions to which said curvature proceeds running through a wide angular range about said initial direction as an axis, and there being in said deflecting surface a ridge whose surface elements partake of the first described curvature and control quantitative distribution of water in the said range.

3. A sprinkler head comprising a nozzle combined with a deflector adapted by its shape, curvature and setting relative to the nozzle to receive impinging discharge stream filaments in a substantially tangential direction and smoothly to impart to all of the stream filaments directions substantially at right angles to the nozzle axis, simultaneously changing the issuing discharge from a concentrated stream to a thin, widely spread, continuous sheet.

Signed at Providence, Rhode Island, this 13th day of July, 1921.

ALBERT J. LOEPSINGER.